(12) United States Patent
Okamoto

(10) Patent No.: US 12,441,838 B2
(45) Date of Patent: Oct. 14, 2025

(54) RESIN COMPOSITION, MOLDED ARTICLE, AND METHOD FOR PRODUCING RESIN COMPOSITION

(71) Applicant: MITSUBISHI ENGINEERING-PLASTICS CORPORATION, Tokyo (JP)

(72) Inventor: Fumihito Okamoto, Hiratsuka (JP)

(73) Assignee: GLOBAL POLYACETAL CO., LTD., Tokyo (JP)

( * ) Notice: Subject to any disclaimer, the term of this patent is extended or adjusted under 35 U.S.C. 154(b) by 909 days.

(21) Appl. No.: 17/623,341

(22) PCT Filed: Jun. 15, 2020

(86) PCT No.: PCT/JP2020/023344
§ 371 (c)(1),
(2) Date: Dec. 28, 2021

(87) PCT Pub. No.: WO2021/014818
PCT Pub. Date: Jan. 28, 2021

(65) Prior Publication Data
US 2022/0356304 A1     Nov. 10, 2022

(30) Foreign Application Priority Data
Jul. 24, 2019   (JP) ................................. 2019-135885

(51) Int. Cl.
*C08G 69/26* (2006.01)
*C08K 3/22* (2006.01)

(52) U.S. Cl.
CPC ............... *C08G 69/26* (2013.01); *C08K 3/22* (2013.01); *C08K 2003/2213* (2013.01); *C08K 2201/019* (2013.01)

(58) Field of Classification Search
CPC ... C08L 77/06; C08L 2203/206; C08G 69/26; C08K 3/22; C08K 3/34; C08K 2003/2213; C08K 2201/019; C08K 5/0041; C08K 7/14; B29C 65/01; B29C 65/1616; B29C 65/1635; B29C 65/165; B29C 65/1677; B29C 65/8215; B29C 65/71; B29C 66/1122; B29C 66/43; B29C 66/7212; B29C 66/73321; B29C 66/919; B29C 66/929; B29C 66/939; G03B 17/00
See application file for complete search history.

(56) References Cited

U.S. PATENT DOCUMENTS

| | | | |
|---|---|---|---|
| 5,057,483 A | 10/1991 | Wan | |
| 2015/0218348 A1 | 8/2015 | Tsunaka et al. | |
| 2016/0102202 A1* | 4/2016 | Lamberts | C08L 77/06 524/413 |
| 2016/0280914 A1* | 9/2016 | Thomas | C08G 69/265 |
| 2018/0171141 A1* | 6/2018 | Thomas | C08K 3/013 |
| 2019/0002692 A1* | 1/2019 | Okamoto | B29C 65/1677 |
| 2020/0198211 A1* | 6/2020 | Hoffmann | C08K 3/014 |

FOREIGN PATENT DOCUMENTS

| | | | | |
|---|---|---|---|---|
| CN | 103443179 A | | 12/2013 | |
| CN | 105492536 A | * | 4/2016 | ............ C08G 69/14 |
| JP | H04-219140 A | | 8/1992 | |
| JP | H08-283451 A | | 10/1996 | |
| JP | 2001-205565 A | | 7/2001 | |
| JP | 2002-194208 A | | 7/2002 | |
| JP | 2012-153749 A | | 8/2012 | |
| JP | 2014-037467 A | | 2/2014 | |
| JP | 2014-509342 A1 | | 4/2014 | |
| JP | 2016-29123 A | | 3/2016 | |
| JP | 2016-529364 A | | 9/2016 | |
| JP | 2018-502082 A | | 1/2018 | |
| JP | 2021-519381 A | | 8/2021 | |
| WO | WO 2012/113146 A1 | | 8/2012 | |
| WO | WO 2014/027649 A1 | | 2/2014 | |
| WO | WO 2015/028292 A1 | | 3/2015 | |
| WO | WO 2016/102343 A1 | | 8/2016 | |
| WO | WO 2019/191574 A1 | | 10/2019 | |

OTHER PUBLICATIONS

International Preliminary Report on Patentability for PCT/JP2020/023344 (PCT/IB/373) issued Jan. 25, 2022, with English Translation.
Extended European Search Report dated Jun. 27, 2023 for Application No. 20845038.7.
Bilin et al., "Catalogue Imprint (CIP) Data China Commodity Dictionary Editorial Board, China Commodity Dictionary: Metal Materials Ed.", China Commercial Press, Dec. 1996, pp. 465-468 (5 pages total), with an English translation.
Chinese Office Action and Search Report for Chinese Application No. 202080052876.4, dated Mar. 10, 2023.
Japanese Office Action for corresponding Japanese Application No. 2021-533860, dated Nov. 7, 2023, with English translation.

* cited by examiner

*Primary Examiner* — Shane Fang
(74) *Attorney, Agent, or Firm* — Birch, Stewart, Kolasch & Birch, LLP

(57) ABSTRACT

To provide a resin composition capable of effectively suppressing the mechanical strength from degrading even if kept under high temperatures and high humidity, and of suppressing color transfer, as well as a molded article with use of the resin composition, and a method for producing the resin composition. The resin composition contains a polyamide resin and cerium oxide, with a lanthanum content in the resin composition of more than 0 ppm by mass and 40 ppm by mass or less.

16 Claims, No Drawings

RESIN COMPOSITION, MOLDED ARTICLE, AND METHOD FOR PRODUCING RESIN COMPOSITION

TECHNICAL FIELD

This invention relates to a resin composition, a molded article, and a method for producing the resin composition.

BACKGROUND ART

One known application of polyamide resin relates to parts that are used under high temperatures and high humidity. Polyamide resin which is intended for use under high temperatures and high humidity needs to be suppressed from being damaged by thermal oxidation. More specifically, the polyamide resin needs to be suppressed from being degraded in mechanical strength, even after kept under high temperatures and high humidity. As one exemplary means for improving heat aging resistance of the mechanical strength, Patent Literature 1 describes that a copper compound such as copper iodide is added as a heat stabilizer to the polyamide resin. Patent Literature 1 also describes that "A monovalent or divalent copper compound is contained for heat stabilization, in combination with the inorganic radical scavenger which is a cerium-containing and/or lanthanum-containing compound, and particularly preferably cerium tetrahydroxide and/or lanthanum trihydroxide. A strong synergistic effect was surprisingly discovered, which is supposedly ascribed to a fact that the combination enhanced reactivity of both metals, thereby enhancing the activity of the copper compound as the heat stabilizer.

CITATION LIST

Patent Literature

[Patent Literature 1] JP-2016-529364A

SUMMARY OF THE INVENTION

Technical Problem

It has been a known practice to use the copper compound as the heat stabilizer, as described previously. Mixing of the polyamide resin with the copper compound would have succeeded in suppressing the mechanical strength from degrading after storage under high temperatures and high humidity, but has been occasionally found to cause color transfer. There is therefore a need for a polyamide resin composition capable of suppressing color transfer, without mixing the copper compound.

This invention is aimed at solving the aforementioned problem, and an object of which is to provide a resin composition capable of effectively suppressing the mechanical strength from degrading even if kept under high temperatures and high humidity, and of suppressing color transfer, as well as a molded article with use of the resin composition, and a method for producing the resin composition.

Solution to Problem

The present inventors conducted research to address the above-mentioned problems, and as a result, the problems described above are solved by the following means <1>, and preferably by the following means <2> to <11>.

<1> A resin composition comprising a polyamide resin and cerium oxide, with a lanthanum content in the resin composition of more than 0 ppm by mass and 40 ppm by mass or less.

<2> The resin composition of <1>, containing cerium oxide with a lanthanum content, measured by ICP emission spectrometry, of more than 0% by mass and 1% by mass or less.

<3> The resin composition of <1> or <2>, with a cerium oxide content in the resin composition of 0.01 to 5% by mass.

<4> The resin composition of any one of <1> to <3>, demonstrating a retention rate of tensile strength of 55% or larger, when the resin composition is formed into a 1.5 mm thick No. 4 specimen conforming to the ASTM D638 standard, and measured conforming to the ASTM D638 standard after being kept under conditions of 85° C. and a relative humidity of 85% for 1000 hours.

<5> The resin composition of any one of <1> to <4>, further comprising 25 to 60% by mass of an inorganic filler.

<6> The resin composition of any one of <1> to <5>, wherein the polyamide resin contains a polyamide resin that has a structural unit derived from diamine and a structural unit derived from dicarboxylic acid, in which 70 mol % or more of the structural unit derived from diamine is derived from xylylenediamine, and 70 mol % or more of the structural unit derived from dicarboxylic acid is derived from a straight chain aliphatic α,ω-dicarboxylic acid having 4 to 20 carbon atoms.

<7> The resin composition of any one of <1> to <6>, wherein content of a copper compound is 0.01% by mass or less.

<8> A molded article formed from the resin composition described in any one of <1> to <7>.

<9> A molded article comprising a member formed from the resin composition described in any one of <1> to <7>, and a thermoplastic resin member arranged in contact with the member.

<10> A method for producing a resin composition, the method comprising mixing and melt-kneading a polyamide resin and cerium oxide, the cerium oxide having a lanthanum content, measured by ICP emission spectrometry, of more than 0% by mass and 1% by mass or less.

<11> A method for producing a resin composition of <10>, wherein the resin composition is the resin composition described in any one of <1> to <7>.

Advantageous Effects of Invention

This invention enabled provision of a resin composition capable of effectively suppressing the mechanical strength from degrading and of suppressing color transfer, even if kept under high temperatures and high humidity, as well as a molded article with use of the resin composition, and a method for producing the resin composition.

DESCRIPTION OF EMBODIMENTS

This invention will be detailed below. Note that all numerical ranges given in this patent specification, using "to" preceded and succeeded by numerals, are used to represent the ranges including these numerals respectively as the lower and upper limit values.

Again in this patent specification, ppm means ppm by mass.

The resin composition of this invention is a resin composition that contains a polyamide resin and cerium oxide, with a lanthanum content in the resin composition of more than 0 ppm by mass and 40 ppm by mass or less. With such design, an obtainable resin composition will be able to effectively suppress the mechanical strength from degrading, and to suppress color transfer, even if kept under high temperatures and high humidity.

As described previously, the cerium-containing compound such as cerium oxide has been known to demonstrate a strong synergistic effect as a heat stabilizer, when combined with a copper compound. Use of cerium oxide solely by itself has, however, not been examined. The present inventors found out from our examinations that, with a predetermined amount of lanthanum contained therein, and even with cerium oxide used solely by itself, the resin composition can effectively suppress the mechanical strength from degrading and can suppress color transfer, even if kept under high temperatures and high humidity. The finding led us to complete this invention.

This invention will be detailed below.

<Lanthanum Content in Resin Composition>

In the resin composition of this invention, the lanthanum content is more than 0 ppm by mass and 40 ppm or less. With such extremely small amount of lanthanum contained therein, the resin composition can effectively suppress color transfer even if kept under high temperatures and high humidity. With the content controlled to 40 ppm by mass or less, the resin composition can also keep the tensile strength at a high level, even after kept under high temperatures and high humidity.

The lower limit value of the lanthanum content in the resin composition is preferably 0.01 ppm by mass or above, more preferably 0.05 ppm by mass or above, even more preferably 0.1 ppm by mass or above, yet more preferably 0.5 ppm by mass or above, and furthermore preferably 0.8 ppm by mass or above.

The upper limit value of the lanthanum content in the resin composition is preferably 30 ppm by mass or below, more preferably 25 ppm by mass or below, even more preferably 20 ppm by mass or below, yet more preferably 15 ppm by mass or below, and furthermore preferably 12 ppm by mass or below.

The lanthanum content may be measured by a method described later in EXAMPLES.

In the resin composition of this invention, lanthanum is normally incorporated in the form of inclusion in cerium oxide.

<Polyamide Resin>

The polyamide resin employable in this invention may be any of known polyamide resins, without special limitation on their types, and preferably contains at least one type of aliphatic polyamide resin and semi-aromatic polyamide resin, and more preferably contains at least one type of semi-aromatic polyamide resin.

The aliphatic polyamide resin is exemplified by polyamide 4, polyamide 6, polyamide 11, polyamide 12, polyamide 46, polyamide 66, polyamide 6/66, polyamide 610, and polyamide 612. At least one selected from the group consisting of polyamide 6, polyamide 66 and polyamide 6/66 is preferably contained, and polyamide 66 is more preferably contained.

The semi-aromatic polyamide resin means a polyamide resin in which aromatic group-containing structural unit accounts for 30 to 70 mol % (preferably 40 to 60 mol %) of all structural units, and preferably means a polyamide resin that includes a structural unit derived from diamine and a structural unit derived from dicarboxylic acid, in which 70 mol % or more of the structural unit derived from diamine is derived from aromatic group-containing diamine.

The semi-aromatic polyamide resin is specifically exemplified by polyhexamethylene terephthalamide (polyamide 6T), polyhexamethylene isophthalamide (polyamide 6I), polyamide 66/6T, polyamide 9T, polyamide 9MT, polyamide 6I/6T, and xylylenediamine-based polyamide resin, among which xylylenediamine-based polyamide resin is more preferred.

The xylylenediamine-based polyamide resin is a polyamide resin that contains a structural unit derived from diamine and a structural unit derived from dicarboxylic acid, in which 70 mol % or more of the structural unit derived from diamine is derived from xylylenediamine, and 70 mol % or more of the structural unit derived from dicarboxylic acid is derived from a straight chain aliphatic $\alpha,\omega$-dicarboxylic acid having 4 to 20 carbon atoms.

In the xylylenediamine-based polyamide resin, 70 mol % or more of the structural unit derived from diamine is derived from xylylenediamine, wherein the percentage is preferably 80 mol % or larger, even more preferably 90 mol % or larger, yet more preferably 95 mol % or larger, and furthermore preferably 99 mol % or larger.

Xylylenediamine preferably contains 30 to 100 mol % of metaxylylenediamine and 70 to 0 mol % of paraxylylenediamine (where, the total of metaxylylenediamine and paraxylylenediamine does not exceed 100 mol %); more preferably contains 50 to 100 mol % of metaxylylenediamine and 50 to 0 mol % of paraxylylenediamine; even more preferably contains 60 to 100 mol % of metaxylylenediamine and 40 to 0 mol % of paraxylylenediamine, and yet more preferably contains 60 to 90 mol % of metaxylylenediamine and 40 to 10 mol % of paraxylylenediamine. Meanwhile in xylylenediamine, the total of metaxylylenediamine and paraxylylenediamine preferably accounts for 95 mol % or more, more preferably accounts for 99 mol % or more, and even more preferably accounts for 100 mol %.

Diamine component other than xylylenediamine is exemplified by aliphatic diamines such as tetramethylenediamine, pentamethylenediamine, 2-methylpentane diamine, hexamethylenediamine, heptamethylenediamine, octamethylenediamine, nonamethylenediamine, decamethylenediamine, dodecamethylenediamine, 2,2,4-trimethyl-hexamethylenediamine, and 2,4,4-trimethylhexamethylenediamine; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, and bis(aminomethyl)tricyclodecane; and diamines having aromatic ring such as bis(4-aminophenyl)ether, paraphenylenediamine, and bis(aminomethyl)naphthalene. Only one of them may be used solely, or two or more of them may be used in a mixed manner.

In the xylylenediamine-based polyamide resin, 70 mol % or more of the structural unit derived from dicarboxylic acid is derived from the straight chain aliphatic $\alpha,\omega$-dicarboxylic acid having 4 to 20 carbon atoms, wherein the percentage is preferably 80 mol % or larger, more preferably 90 mol % or larger, even more preferably 95 mol % or larger, and yet more preferably 99 mol % or larger.

The straight chain aliphatic $\alpha,\omega$-dicarboxylic acid having 4 to 20 carbon atoms is exemplified by succinic acid, glutaric acid, pimelic acid, suberic acid, azelaic acid, adipic acid, sebacic acid, and 1,12-dodecanedioic acid. At least one selected from adipic acid and sebacic acid is preferably contained.

Dicarboxylic acid other than the aforementioned dicarboxylic acid is exemplified by phthalic acid compounds such as isophthalic acid, terephthalic acid, and orthophthalic acid; and naphthalenedicarboxylic acids such as 1,2-naphthalenedicarboxylic acid, 1,3-naphthalenedicarboxylic acid, 1,4-naphthalenedicarboxylic acid, 1,5-naphthalenedicarboxylic acid, 1,6-naphthalenedicarboxylic acid, 1,7-naphthalenedicarboxylic acid, 1,8-naphthalenedicarboxylic acid, 2,3-naphthalenedicarboxylic acid, 2,6-naphthalenedicarboxylic acid, and 2,7-naphthalenedicarboxylic acid. Only one of them may be used solely, or two or more of them may be used in a mixed manner.

The content of the polyamide resin in the resin composition of this invention, in a case where the resin composition does not contain the inorganic filler, is preferably 80% by mass or more, more preferably 85% by mass or more, even more preferably 90% by mass or more, and yet more preferably 95% by mass or more. In a case where The resin composition of this invention contains the inorganic filler, the total content of the polyamide resin and the inorganic filler preferably accounts for 80% by mass or more of the resin composition, more preferably accounts for 85% by mass or more, even more preferably 90% by mass or more, and yet more preferably 95% by mass or more.

The resin composition of this invention may contain only one kind of the polyamide resin, or two or more kinds. When two or more kinds are contained, the total content preferably falls within the aforementioned ranges.

<Cerium Oxide>

The resin composition of this invention contains cerium oxide. With cerium oxide contained therein, the resin composition can effectively suppress color transfer to other member (in particular, to other thermoplastic resin member), even after kept under high temperatures and high humidity. Cerium oxide, whose Mohs hardness is relatively small, is less likely to damage the inorganic filler such as glass fiber.

Cerium oxide in this invention is specified to have a purity of 90% by mass or higher. That is, cerium oxide may contain an impurity. Cerium oxide in this invention preferably has a lanthanum content, measured by ICP emission spectrometry, of more than 0% by mass and 1% by mass or less, more preferably has a lanthanum content, measured by ICP emission spectrometry, of 0.01 to 0.7% by mass, even more preferably has a lanthanum content, measured by ICP emission spectrometry, of 0.02 to 0.4% by mass, and yet more preferably has a lanthanum content, measured by ICP emission spectrometry, of 0.05 to 0.2% by mass.

With use of such cerium oxide that contains an extremely small amount of lanthanum, a desired amount of lanthanum may be easily incorporated into the resin composition.

Cerium oxide in this invention preferably has a cerium content of 73% by mass or more, which is more preferably 75% by mass or more, and even more preferably 77% by mass or more. Meanwhile, the upper limit of the cerium oxide content is preferably 85% by mass or below, more preferably 83% by mass or below, and even more preferably 80% by mass or below.

Cerium oxide used in this invention preferably has a median diameter (particle size determined by laser diffraction/scattering analysis) of 3 μm or smaller. The lower limit is typically 0.1 μm or above.

With use of such cerium oxide having the aforementioned median diameter, an obtainable resin composition will be further less likely to damage the inorganic filler such as glass fiber, and will more excel in mechanical strength.

The cerium oxide content in the resin composition of this invention is preferably 0.01% by mass or more of the resin composition, and is more preferably 0.05% by mass or more. The upper limit value is preferably 5% by mass or below, more preferably 4% by mass or below, even more preferably 3% by mass or below, and yet more preferably 2% by mass or below.

<Copper Compound>

The resin composition of this invention may contain, or may be free of, a copper compound.

The copper compound is exemplified by copper halide.

One embodiment of the resin composition of this invention is exemplified by a resin composition in which content of the copper compound in the resin composition is 0.01% by mass or less. In this embodiment, the content of the copper compound is more preferably 0.001% by mass or less, and is more preferably below the detection limit. The content of the copper compound in the resin composition is specified to be measured by X-ray fluorescence analysis.

<Inorganic Filler>

The resin composition of this invention may contain an inorganic filler. With the inorganic filler contained therein, the resin composition can achieve high mechanical strength. Note that the inorganic filler in this embodiment does not encompass those equivalent to cerium oxide and nucleating agent described later.

The inorganic filler employable here includes fibrous inorganic fillers such as glass fiber, carbon fiber, basalt fiber, wollastonite, and potassium titanate fiber. Also particle-like or indefinite-shaped fillers such as calcium carbonate, titanium oxide, feldspar-based mineral, clay, and glass bead; and flaky fillers such as glass flake, and graphite may be used. Among them, the fibrous fillers, and particularly glass fiber is suitably used from the viewpoints of mechanical strength, rigidity and heat resistance.

The glass fiber has a glass composition of A-glass, C-glass, E-glass, S-glass, D-glass, M-glass, R-glass or the like, among which E-glass (non-alkali glass) is particularly preferred since it does not adversely affect the polyamide resin.

The glass fiber means an article having a true circular or polygonal cross section when viewed perpendicularly to the longitudinal direction, and having a fiber-like appearance.

The glass fiber used for the resin composition of this invention may be a monofilament, or may be a twisted yarn fouled by twisting a plurality of monofilaments.

Product form of the glass fiber may be any of "glass roving" which is a continuously wound monofilament or twisted yarn formed by twisting a plurality of monofilaments, "chopped strand" chopped to a uniform length of 1 to 10 mm, and "milled fiber" ground to a length of 10 to 500 μm. Such glass fibers are marketed under the trade names of "Glasron Chopped Strand" and "Glasron Miller Fiber" from Asahi Fiber Glass Co., Ltd., which are readily available. Any glass fibers having different morphologies may be combined.

The glass fiber in this invention may preferably have a modified cross section. The modified cross section is defined by a flattening, which is given by ratio (D2/D1) of long diameter D2 and short diameter D1 of a cross section taken in the direction normal to the longitudinal direction of the fiber, of typically 1.5 to 10, which is preferably 2.5 to 10, more preferably 2.5 to 8, and particularly preferably 2.5 to 5. Regarding such flattened glass, the descriptions in paragraphs [0065] to [0072] of JP-2011-195820 A may be referred to, the contents of which are incorporated by reference into this patent specification.

Amount of mixing of the inorganic filler in the resin composition of this invention is preferably 25% by mass or more of the polyamide resin composition, which is more preferably 28° by mass or more. The upper limit value, although not specifically limited, is preferably 60% by mass or below, more preferably 50% by mass or below, and even more preferably 45% by mass or below. The resin composition of this invention may contain only one kind of the inorganic filler, or may contain two or more kinds thereof. When two or more kinds are contained, the total content falls within the aforementioned ranges.

<Nucleating Agent>

The resin composition of this invention may contain a nucleating agent, for the purpose of modifying crystallization rate. The nucleating agent is preferably, but not specifically limited to, talc, boron nitride, mica, kaolin, calcium carbonate, sodium carbonate ($Na_2CO_3$), potassium carbonate ($K_2CO_3$), sodium hydrogen carbonate ($NaHCO_3$), potassium hydrogen carbonate ($KHCO_3$), barium sulfate, silicon nitride, potassium titanate or molybdenum disulfide, among which talc and boron nitride are more preferred, and talc is even more preferred.

Content of the nucleating agent, when contained in the resin composition of this invention, is preferably 0.01 to 10 parts by mass, per 100 parts by mass of the polyamide resin, more preferably 0.1 to 8 parts by mass, and even more preferably 0.1 to 6 parts by mass.

The resin composition of this invention may contain only one kind of nucleating agent, or may contain two or more kinds thereof. When two or more kinds are contained, the total content preferably falls within the aforementioned ranges.

<Mold Releasing Agent>

The resin composition of this invention may also contain a mold releasing agent.

The mold releasing agent is exemplified by aliphatic carboxylic acid, aliphatic carboxylic acid salt, ester formed of aliphatic carboxylic acid and alcohol, aliphatic carboxylic acid amide, aliphatic hydrocarbon compound having number average molecular weight of 200 to 15,000, and polysiloxane-based silicone oil.

For details of the mold releasing agent, the description in paragraphs [0034] to [0039] of JP-2017-115093 A may be referred to, the contents of which are incorporated by reference into this patent specification.

Content of the mold releasing agent, when contained in the resin composition of this invention, is preferably 0.05 to 1 parts by mass, per 100 parts by mass of the polyamide resin, more preferably 0.1 to 0.8 parts by mass, and even more preferably 0.2 to 0.6 parts by mass.

The resin composition of this invention may contain only one kind of mold releasing agent, or two or more kinds. When two or more kinds are contained, the total content preferably falls within the aforementioned ranges.

<Other Components>

The resin composition of this invention may contain any other component without departing from the spirit of this invention. Such additive is exemplified by flame retardant, flame retardant auxiliary, UV absorber, antioxidant, fluorescent brightener, anti-dripping agent, antistatic agent, anti-clouding agent, anti-blocking agent, flow improver, plasticizer, dispersion aid and antibacterial agent. Only one of these components may be used solely, or two or more of them may be used in a combined manner.

Note that for the resin composition of this invention, contents of the polyamide resin, cerium oxide, and such other component(s) optionally added are determined so that the total will be adjusted to 100% by mass.

<Physical Properties of Resin Composition>

In this invention, the resin composition of this invention preferably demonstrates a retention rate of tensile strength of 55% or larger, when formed into a 1.5 mm thick No. 4 specimen conforming to the ASTM D638 standard, and measured conforming to the ASTM D638 standard after being kept under conditions of 85° C. and a relative humidity of 85% for 1000 hours. The retention rate is more preferably 57% or larger, and even more preferably 58% or larger. The upper limit value, which would ideally be 100%, is practically 80% or below, and more practically 70% or below.

<Method for Producing Resin Composition>

The resin composition of this invention contains the aforementioned essential components, and the aforementioned freely selectable component(s) employed as necessary. The method for preparation may be freely selectable from any of known methods, in which these raw materials may only be melt-kneaded.

Kneading apparatus is exemplified by kneader, Bunbury mixer and extruder. Also conditions and apparatuses of mixing and kneading are not specifically limited, for which any of known conditions are suitably selectable. Kneading is preferably conducted at or above a temperature where the polyamide resin can melt.

A more specific method for preparation is exemplified by a method that includes mixing and melt-kneading a polyamide resin and cerium oxide, wherein the cerium oxide having a lanthanum content, measured by ICP emission spectrometry, of more than 0% by mass and 1% by mass or less.

<Molded Article>

A molded article of this invention is formed from the resin composition of this invention.

Pellets obtained by pelletizing the resin composition of this invention are formed by any of various forming methods into the molded article. Alternatively, the resin composition after melt-kneaded in an extruder may be directly formed into the molded article, without being pelletized.

Shape of the molded article is suitably selectable, without special limitation depending on applications and purposes of the molded article, typically from board-like, plate-like, rod-like, sheet-like, film-like, cylindrical, annular, elliptic, gear-like, polygonal, shape-modified, hollow, frame-like, box-like, panel-like, and cap-like shapes. The molded article of this invention may be a final product, or may be a part or a member.

Method for forming the molded article may employ, without special limitation, any of known methods of forming that are exemplified by injection molding, injection compression molding, extrusion molding, profile extrusion, transfer molding, hollow molding, gas-assisted molding, blow molding, extrusion blow molding, IMC (in-molding coating), rotational molding, multi-layer molding, two-color molding, insert molding, sandwich molding, foam molding, and pressure molding.

In particular, the molded article of this invention, featured by its excellent moist and heat resistance, is suitable for applications intended for use under high temperatures and high humidity. Since the resin composition of this invention can also effectively suppress color transfer to other resin member, this invention is suitably applicable to a molded article that includes a member formed from the resin composition of this invention, and a thermoplastic resin member arranged in contact with the member. Now, "in contact with" means that at least parts of both members are brought into contact, while sharing a contact area of 1 $cm^2$ or larger. The upper limit value of the contact area, although not specifically limited, is usually 50% or below of the surface area of the members.

The resin composition of this invention, when mixed with a light-transmitting dye, is also applicable to a resin composition for laser welding, arranged on the light-transmitting side (light-transmitting resin composition). On the other hand, the resin composition of this invention, when mixed with a light-absorbing dye, is also applicable to a resin composition for laser welding, arranged on the light-absorbing side (light-absorbing resin composition). Still alternatively, the light-transmitting resin composition and the light-absorbing resin composition may be used to form a laser-welded molded article. For details of laser welding, the descriptions in paragraphs in WO2017/110372, particularly in paragraphs [0031], and [0043] to may be referred to, the contents of which are incorporated by reference into this patent specification.

The molded article of this invention is applicable to various purposes, such as a variety of storage containers, electrical/electronic equipment, office automation (OA) equipment, home electric appliances, machine and mechanism parts, and vehicle mechanism parts. In particular, the molded article is suitable for food container, drug container, oil and fat products container, vehicle hollow parts (various tanks, intake manifold part, camera enclosure, etc.), vehicle electrical parts (various control units, ignition coil part, etc.), motor part, various sensor parts, connector part, switch part, breaker part, relay part, coil part, transformer part and lamp part, and so forth.

EXAMPLES

This invention will further be detailed referring to Examples. Materials, amounts of consumption, ratios, process details, process procedures and so forth described in Examples below may suitably be modified without departing from the spirit of this invention. The scope of this invention is therefore not limited to the specific Examples below.

[Raw Materials]
MP10: Synthesized as described in Exemplary Synthesis below.
MP6: Synthesized as described in Exemplary Synthesis below.
PA66: Polyamide 66, Stabamid 26AE1K, from Solvay S.A.

<Exemplary Synthesis of MP10 (M/P=7:3)>
Sebacic acid was dissolved under heating in a reaction can with a nitrogen atmosphere, the content was kept stirred, to which a mixed diamine (from Mitsubishi Gas Chemical Company, Inc.) having 7:3 molar ratio of metaxylylenediamine and paraxylylenediamine was gradually added dropwise under pressure (0.35 MPa), so as to adjust the molar ratio of diamine and sebacic acid to approximately 1:1, while elevating the temperature up to 235° C. After completion of the dropwise addition, the reaction was allowed to proceed for 60 minutes so as to control content of fraction having a molecular weight of 1,000 or smaller. Upon completion of the reaction, the content was taken out in the form of strands, and pelletized with use of a pelletizer, to obtain a polyamide resin (MP10, M/P=7:3).

<Exemplary Synthesis of MP6 (M/P=7:3)>
Adipic acid was dissolved under heating in a reaction can with a nitrogen atmosphere, the content was kept stirred, to which a mixed diamine (from Mitsubishi Gas Chemical Company, Inc.) having 7:3 molar ratio of metaxylylenediamine and paraxylylenediamine was gradually added dropwise under pressure (0.35 MPa), so as to adjust the molar ratio of diamine and adipic acid (from Rhodia) to approximately 1:1, while elevating the temperature up to 270° C. After completion of the dropwise addition, the pressure was reduced down to 0.06 MPa, and the reaction was allowed to proceed for 60 minutes so as to control content of fraction having a molecular weight of 1,000 or smaller. The content was then taken out in the form of strands, and pelletized with use of a pelletizer, to obtain a polyamide resin (MP6, M/P=7:3).

Glass fiber: T-756H, from Nippon Electric Glass Co., Ltd., with urethane-based sizing agent, E-glass Talc: Micron White #5000S, from Hayashi Kasei Co., Ltd.

Mold releasing agent: Light Amide WH255, from Kyoeisha Chemical Co., Ltd.

CuI: Copper(I) iodide, from Nihon Kagaku Sangyo Co., Ltd.

Cerium oxide 1: cerium oxide with purity ≥90% by mass, Cerium Oxide Hydrate 90, from Treibacher Industrie Japan K.K., cerium content=72.1% by mass, lanthanum content=4.4% by mass, median diameter (particle size determined by laser diffraction/scattering analysis) ≤2 μm Cerium oxide 2: cerium oxide with purity ≥90% by mass, Cerium Hydrate 90, from Treibacher Industrie Japan K.K., cerium content=78.5% by mass, lanthanum content=0.1% by mass, median diameter (particle size determined by laser diffraction/scattering analysis)≤3 μm <Analysis of Lanthanum and Cerium Contents in Cerium Oxide>

A sample was dried in the air atmosphere under heating at 120° C. for 2 hours. One hundred milligrams of the sample was precisely weighed, to which perchloric acid, hydrogen peroxide solution and water were added, heated for decomposition, to which water was added up to a certain volume. The obtained solution was diluted, and subjected to ICP emission spectrometry (ICP-AES), in which Ce was quantified by acid-concentration matching with use of analytical curve, and La was quantified by standard addition method with use of analytical curve.

Reference Example 1, Examples 1 to 6, Comparative Examples 1 to 4

The individual components listed in Table 1 or Table 2 below, except the glass fiber, were weighed according to the ratios (in parts by mass) listed in Table 1 or Table 2, dry-blended, and fed from the base of screws of a twin-screw extruder (TEM26SS, from Toshiba Machine Co., Ltd.) by using a twin-screw cassette weighing feeder (CE-W-1-MP, from Kubota Corporation). The glass fiber was fed by using a vibrating cassette weighing feeder (CE-V-1B-MP, from Kubota Corporation), from the lateral side of the aforementioned twin-screw extruder, then melt-kneaded with the resin component and so forth, thereby obtaining the pellets (resin composition).

The obtained pellets were dried at 120° C. for 4 hours, and then formed into a 1.5 mm thick No. 4 specimen conforming to the ASTM D638 standard, with use of an injection molding machine (SE-50D, from Sumitomo Heavy Industries, Ltd.).

<Retention Rate of Tensile Strength after Keeping Under High Temperatures and High Humidity>

The No. 4 specimen conforming to the ASTM D638 standard, obtained in Example 1, was kept stand still under conditions of 85° C. and a relative humidity of 85% for 1000 hours. Tensile strength of the No. 4 specimen conforming to the ASTM D638 standard, before and after the still keeping, was measured according to the ASTM D638 standard. The retention rate was determined from the equation below.

Retention rate of tensile strength (%)=[(Tensile strength measured after still keeping)/(Tensile strength measured before still keeping)]×100

Also the No. 4 specimens conforming to the ASTM D638 standard obtained in Reference Example 1, Examples 2 to 6 and Comparative Examples 1 to 4 were measured in the same way.

<Color Transfer Measured after Keeping Under High Temperatures and High Humidity>

The No. 4 specimen conforming to the ASTM D638 standard obtained in Example 1, and the No. 4 specimen conforming to the ASTM D638 standard obtained in Reference Example 1 were stacked, bound at both ends in the longitudinal direction with binder clips (medium-size), and kept stand still under conditions of 85° C. and a relative humidity of 85% for 1000 hours. After the still keeping, the No. 4 specimen conforming to the ASTM D638 standard obtained in Example 1 was visually observed to check whether there is any color transfer or not.

Also the No. 4 specimens conforming to the ASTM D638 standard obtained in Examples 2 to 6 and Comparative Examples 1 to 4 were processed and checked in the same way.

A: Color transfer not found.
B: Color transfer found.

TABLE 1

|  | Reference Example 1 | Example 1 | Example 2 | Example 3 | Example 4 | Example 5 |
|---|---|---|---|---|---|---|
| MP10 | 69.7 | 68.1 | 67.2 |  |  |  |
| MP6 |  |  |  | 68.1 | 67.2 |  |
| PA66 |  |  |  |  |  | 68.1 |
| Glass fiber | 30 | 30 | 30 | 30 | 30 | 30 |
| Talc |  | 1.5 | 1.5 | 1.5 | 1.5 | 1.5 |
| Mold releasing agent | 0.3 | 0.3 | 0.3 | 0.3 | 0.3 | 0.3 |
| CuI |  |  |  |  |  |  |
| Cerium oxide 1 |  |  |  |  |  |  |
| Cerium oxide 2 |  | 0.1 | 1 | 0.1 | 1 | 0.1 |
| La content in resin composition (ppm) | — | 1 | 10 | 1 | 10 | 1 |
| Retention rate of tensile strength after keeping at 85° C., 85% R.H. for 1000 h (%) | 56 | 69 | 59 | 64 | 64 | 62 |
| Color transfer after keeping at 85° C., 85% R.H. for 1000 h (%) | — | A | A | A | A | A |

TABLE 2

|  | Example 6 | Comparative Example 1 | Comparative Example 2 | Comparative Example 3 | Comparative Example 4 |
|---|---|---|---|---|---|
| MP10 |  | 68.1 | 67.2 | 68.1 | 67.2 |
| MP6 |  |  |  |  |  |
| PA66 | 67.2 |  |  |  |  |
| Glass fiber | 30 | 30 | 30 | 30 | 30 |
| Talc | 1.5 | 1.5 | 1.5 | 1.5 | 1.5 |
| Mold releasing agent | 0.3 | 0.3 | 0.3 | 0.3 | 0.3 |
| CuI |  |  |  | 0.1 | 1 |
| Cerium oxide 1 |  | 0.1 | 1 |  |  |
| Cerium oxide 2 | 1 |  |  |  |  |
| La content in resin composition (ppm) | 10 | 44 | 440 | — | — |
| Retention rate of tensile strength after keeping at 85° C., 85% R.H. for 1000 h (%) | 64 | 49 | 51 | 60 | 60 |
| Color transfer after keeping at 85° C., 85% R.H. for 1000 h (%) | A | A | A | B | B |

In this study, the lanthanum content in the resin composition was calculated from the lanthanum content ascribed to cerium oxide. The lanthanum content in other components were found to be below the detection limit.

As is obvious from the results above, the resin compositions of this invention were found to demonstrate high retention rate of tensile strength and no color transfer, after kept under high temperatures and high humidity (Examples 1 to 6).

In contrast, with the lanthanum content in the resin composition exceeding 40 ppm by mass (Comparative Examples 1, 2), the resin compositions were found to considerably degrade the tensile strength, after kept under high temperatures and high humidity.

Use of the copper compound as the stabilizer (Comparative Examples 3, 4) was found to cause color transfer, after the keeping under high temperatures and high humidity.

The invention claimed is:

1. A resin composition comprising a polyamide resin and cerium oxide wherein any lanthanum in the resin composition is from the cerium oxide having a lanthanum content, measured by ICP emission spectrometry, of more than 0% by mass and 1% by mass or less, and
   wherein the lanthanum content in the resin composition is more than 0 ppm by mass and 40 ppm by mass or less, and
   wherein the cerium oxide has a median diameter (particle size determined by laser diffraction/scattering analysis) of 0.1 to 3 µm; and
   the cerium oxide has a purity of at least 90% and a lanthanum content of 0.01 to 0.7% by mass when measured by ICP emission spectrometry.

2. The resin composition of claim 1, with a cerium oxide content in the resin composition of 0.01 to 5% by mass.

3. The resin composition of claim 1, demonstrating a retention rate of tensile strength of 55% or larger, when the resin composition is formed into a 1.5 mm thick No. 4 specimen conforming to the ASTM D638 standard, and measured conforming to the ASTM D638 standard after being kept under conditions of 85° C. and a relative humidity of 85% for 1000 hours.

4. The resin composition of claim 1, further comprising 25 to 60% by mass of an inorganic filler.

5. The resin composition of claim 1, wherein the polyamide resin contains a polyamide resin that has a structural unit derived from diamine and a structural unit derived from dicarboxylic acid, in which 70 mol % or more of the structural unit derived from diamine is derived from xylylenediamine, and 70 mol % or more of the structural unit derived from dicarboxylic acid is derived from a straight chain aliphatic α,ω-dicarboxylic acid having 4 to 20 carbon atoms.

6. The resin composition of claim 1, wherein content of a copper compound is 0.01% by mass or less.

7. The resin composition of claim 3, further comprising 25 to 60% by mass of an inorganic filler.

8. The resin composition of claim 3, wherein content of a copper compound is 0.01% by mass or less.

9. The resin composition of claim 2, demonstrating a retention rate of tensile strength of 55% or larger, when the resin composition is formed into a 1.5 mm thick No. 4 specimen conforming to the ASTM D638 standard, and measured conforming to the ASTM D638 standard after being kept under conditions of 85° C. and a relative humidity of 85% for 1000 hours.

10. The resin composition of claim 2, further comprising 25 to 60% by mass of an inorganic filler.

11. The resin composition of claim 2, wherein the polyamide resin contains a polyamide resin that has a structural unit derived from diamine and a structural unit derived from dicarboxylic acid, in which 70 mol % or more of the structural unit derived from diamine is derived from xylylenediamine, and 70 mol % or more of the structural unit derived from dicarboxylic acid is derived from a straight chain aliphatic α,ω-dicarboxylic acid having 4 to 20 carbon atoms.

12. The resin composition of claim 2, wherein content of a copper compound is 0.01% by mass or less.

13. A molded article formed from the resin composition described in claim 1.

14. A molded article comprising a member formed from the resin composition described in claim 1, and a thermoplastic resin member arranged in contact with the member.

15. A method for producing the resin composition of claim 1, the method comprising mixing and melt-kneading a polyamide resin and cerium oxide, the cerium oxide having a lanthanum content.

16. A method for producing a resin composition of claim 7, wherein the resin composition comprises a polyamide resin and cerium oxide,
   with a lanthanum content in the resin composition of more than 0 ppm by mass and 40 ppm by mass or less.

* * * * *